April 25, 1933.  J. SUNNEN  1,905,012
COMBINED VALVE LIFTER, SPRING COMPRESSOR, AND REPLACER
Filed Dec. 4, 1930  2 Sheets-Sheet 1
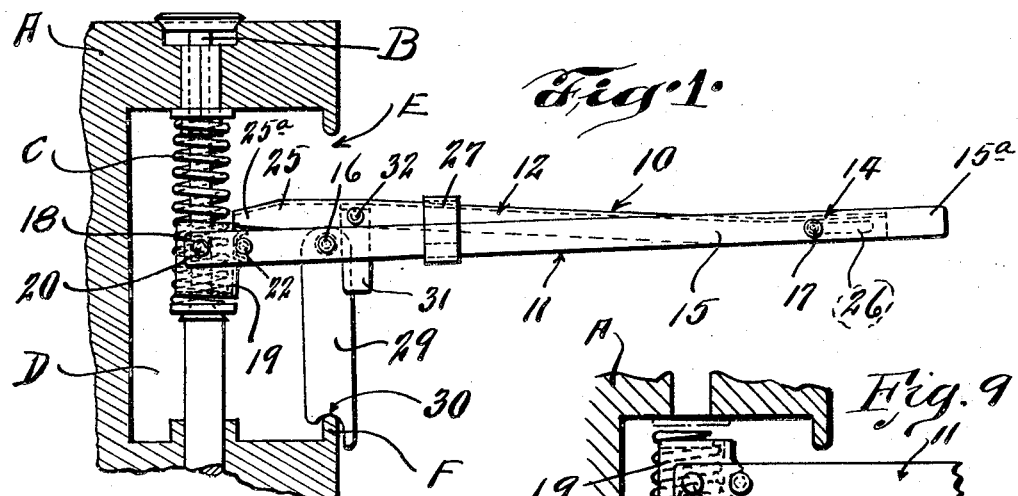
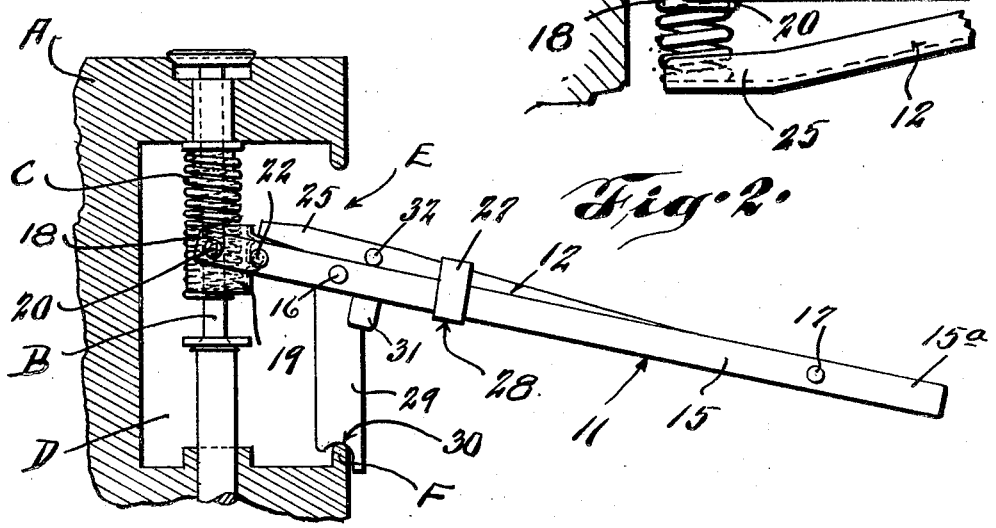
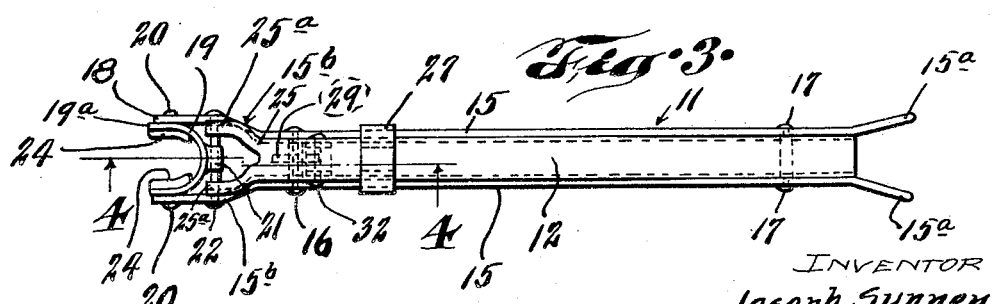
INVENTOR
Joseph Sunnen
By William James
ATTORNEY April 25, 1933.  J. SUNNEN  1,905,012
COMBINED VALVE LIFTER, SPRING COMPRESSOR, AND REPLACER
Filed Dec. 4, 1930  2 Sheets-Sheet 2
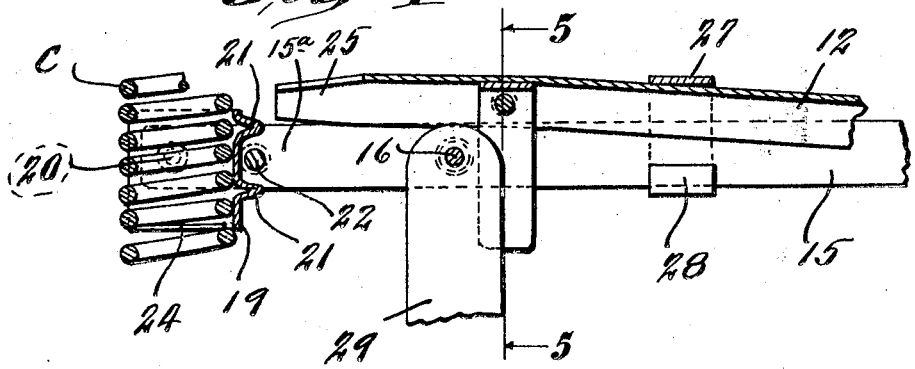
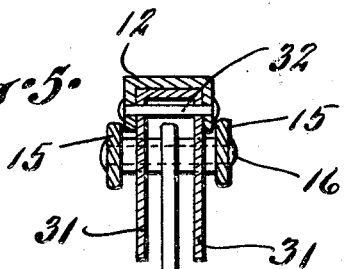
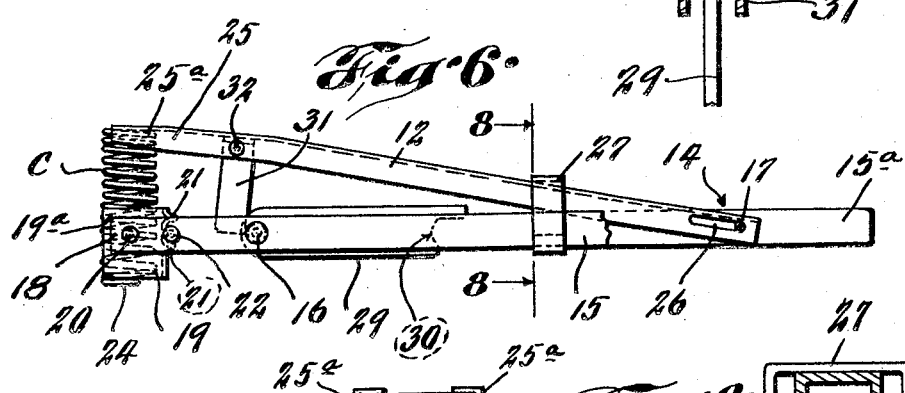
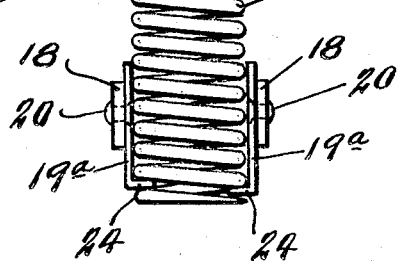
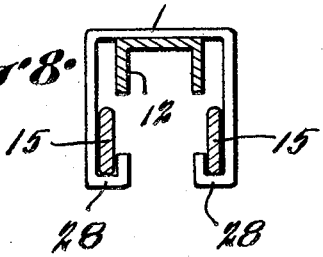
INVENTOR
Joseph Sunnen
By William Janne
ATTORNEY Patented Apr. 25, 1933

1,905,012

UNITED STATES PATENT OFFICE

JOSEPH SUNNEN, OF KIRKWOOD, MISSOURI

COMBINED VALVE LIFTER, SPRING COMPRESSOR, AND REPLACER

Application filed December 4, 1930. Serial No. 499,893.

This invention relates to new and useful improvements in combined valve lifter, spring compressor and replacer for internal combustion engines, the objects of the invention being the provision of a tool which is so constructed that it can be used especially in connection with internal combustion engines wherein the valve assemblies are located in restricted recesses formed in the engine block.

Further objects of the invention are to provide a valve lifter having a pivotally mounted pendant member adapted to rest upon the upwardly flanged lower edge of the recess in which the valve assembly is located so as to serve as a fulcrum for said valve lifter, said pendant member being foldable longitudinally of said valve lifter when not in use.

Other objects of the invention are to provide a combined valve lifter, valve spring compressor and replacer having a longitudinally displaceable upper jaw member so as to retract the latter rearwardly when the tool is used as a valve lifter, said displaceable jaw member being pivotally mounted so as to engage the upper end of the spring and compress the latter between the jaws of the tool when said tool is used as a spring compressor, there being a suitable locking member provided for locking the jaw members together when the spring is compressed between the jaws thereof.

Still further objects of the invention are to provide a tool adapted to be used for various purposes in assembling and disassembling the valve spring mechanism of internal combustion engines and particularly engines used in a well-known make of automobile and having comparatively limited clearance for engaging and operating upon the springs of the valve mechanism.

Additional objects of the invention are to provide a combined valve lifter, spring compressor and replacer which is highly efficient in performing its intended functions, is of rugged construction, and can be economically manufactured.

With these and other objects in view, my invention consists in certain novel features of construction and arrangement of parts, hereinafter more fully described and claimed, and illustrated in the accompanying drawings, in which—

Figure 1 is a side elevational view of the tool showing the same used as a valve lifter, the valve assembly being shown in elevation, and a fragmental portion of the engine block being shown.

Figure 2 is a view similar to Figure 1 but showing the valve lifter in moved position with the valve spring displaced preparatory to the disassembly of the valve structure.

Figure 3 is a top plan view of the tool as shown in Figure 1.

Figure 4 is an enlarged vertical cross section taken on line 4—4 of Figure 3.

Figure 5 is an enlarged vertical cross section taken on line 5—5 of Figure 4.

Figure 6 is a side elevational view of the tool showing the same as being used as a spring compressor with the spring shown in compressed position.

Figure 7 is an enlarged front elevational view of the tool, showing the spring engaged thereby.

Figure 8 is an enlarged vertical cross section taken on line 8—8 of Figure 6.

Figure 9 shows the tool in position to replace the valve spring.

The present invention has reference to a tool which may be used as a valve lifter, spring compressor, and spring replacer. The tool is so constructed that it can be used upon valve mechanism confined in restricted spaces and not conveniently reached by ordinary tools.

Referring by reference characters to the accompanying drawings, A indicates a fragmental portion of the engine block having a valve stem B and a coiled spring C. The valve stem and the coiled spring are located in a recess D which is formed with a flanged opening E, the lower edge of the opening being formed with an upwardly projecting flange F.

The tool or combined lifter, spring compressor and spring replacer 10 consists of two members 11 and 12 having a slot and pin interconnection near their rear ends as indicated at 14. The base or main member 11 consists of a pair of longitudinally disposed bars 15 held in spaced parallel relation by a plurality of spacers, such as 16 and 17. Preferably the rear ends of the bars are spread apart or formed divergent as indicated at 15a in order to increase the stability of the tool when used as a spring compressor.

The front ends of the bars 15 are curved outwardly as indicated at 15b with the extremities disposed in parallelism as indicated at 18. The purpose of spreading the forward ends 18 is to permit the reception therebetween of a jaw 19. This jaw is formed semi-circular in top plan view and is of greater depth than said bars 15 so that the lower edge of the jaw extends a suitable distance below said bars. The jaw 19 opens outwardly, the forward edges thereof being disposed parallel with ends 18 and presented in the same direction. Jaw 19 is pivotally mounted on each side to the corresponding end 18 by means of pins or rivets 20 so that said jaw can tilt about a horizontal axis. Extending rearwardly from the curved wall of jaw 19 is a pair of lugs 21 which are spaced in a vertical plane from each other and are disposed above and below a pin 22. This pin extends between end portions 18 rearwardly of jaw 19 and the ends of said pin are flexed in said end portions 18. The purpose of this pin and lugs 21 is to limit the tilting movement of jaw 19 so that the latter cannot assume inoperative position.

The lower edges of the straight walls 19a of member 19 are provided with inwardly presented ledges or shoulders 24 which form the seat for the coils of the lower end of the spring. As the coils of the springs are inclined from horizontal, ledges or shoulders 24 are disposed on different horizontal planes relative to each other in order to facilitate the engagement thereof with the coil of the spring (see Fig. 7).

Bars 15 are spaced a suitable distance from each other so as to receive therebetween the movable member 12. This member is preferably channel-shape in cross section with the flanges presented downwardly (see Fig. 3). The forward end of this member is bifurcated to form an upper jaw 25 for engaging the upper end of the spring. The flanges of the rear end of member 12 are formed with longitudinally disposed slots 26 which are traversed by the rear spacer 17. By means of this slot and pin connection, member 12 is pivotally mounted on member 11 so that the tool can be used as a spring compressor (see Fig. 6) and also said member 12 can be moved longitudinally into retracted position with the jaw 25 disposed rearwardly of jaw 19 when the tool is used as a valve lifter (see Figs. 3 and 4).

The members 11 and 12 are locked in relative positions by means of a locking member 27. This locking member is in sliding engagement with said jaw members and is of inverted U-shape with the horizontal portion bearing on top of web portion of member 12 and with the depending legs disposed against the outer sides of bars 15. The ends of the legs are turned inwardly and then upwardly as indicated at 28, so as to embrace the lower edges of said bars and provide frictional engagement between said locking member and said bars opposite to the frictional engagement of the locking member with the movable member 12. Member 27 is prevented from being disengaged or removed from the tool by the outwardly spread ends 15a, located at the rear end of the tool, and the spread ends 18 and 25 of members 11 and 12, respectively, at the front end of the tool.

Spacer 16, which is arranged near the forward end of the tool, has pivotally mounted thereon one end of a pendant member 29. The other end of said member is provided with a downwardly presented notch 30 which when said pendant member 29 occupies vertical or downward position is adapted to engage the upwardly presented flange F of the valve assembly recess D (see Figs. 1 and 2). When in this position, member 29 forms a fulcrum for the tool and supports the latter in proper position relative to the spring so that by pressing on the rear end of the tool the forward end thereof is moved upwardly, thereby unseating the lower end of said spring as indicated in Figure 2.

When member 29 is not in use, as for instance, when the tool is used as a spring compressor, said member 29 is moved rearwardly into a horizontal position between bars 15, as shown in Figure 6. When thus folded, said member projects only slightly above and below the edges of bars 15 and does not interfere either with the folded position of member 12 or with the ends of the tool when said tool is supported on a bench.

In order to prevent accidental displacement or longitudinal movement of the upper member 12 when the tool is in use, said member is provided near its forward end with an inverted U-shape member 31 which is secured to the flanges of member 12 by rivet 32 and extends downwardly therefrom a suitable distance. The depending legs of member 31 are arranged to each side of pendant member 29 so that these do not interfere with each other. Member 31 is so located with respect to spacer 16 that when member 12 occupies retracted position, the depending portions of member 31 are disposed rearwardly of said spacer (see Figs. 1 and 4) so that said member cannot move forwardly when in this position.

When the member 12 occupies forward position and engages the upper end of the spring to be compressed, the ends of the portions of member 31 are located forwardly of spacer 16 so that said upper or movable member 12 cannot be accidentally retracted or moved rearwardly during the compression or downward movement thereof (see Fig. 6).

The locking member 27 serves to lock members 11 and 12 together when the tool is used as a valve lifter and member 12 occupies retracted position (see Fig. 4) and said member 27 is also used to lock members 11 and 12 together when the tool is used as a spring compressor and the valve spring occupies compressed position between the jaws 19 and 25 of members 11 and 12. The slots 26 formed in the flanges of member 12 are of proper length so as to permit only the desired forward or rearward movement of member 12 with respect to member 11.

Jaw 19 is so disposed that the lower end thereof, including the ledges or flanges 24, is disposed a suitable distance below the bifurcated end of the lower member 11. When the tool is used as a valve lifter, the tool is placed in position so that the ledges 24 engage the next to the last coil of the spring C and the member 29 is swung in position so that its notched lower end 30 rests on flange F of the engine block. The rear end of the tool is now pressed downwardly so as to raise the forward or jaw end thereof, thereby moving the spring upwardly from its seat so that the valve stem B can be disengaged from position. The disposition of portions 24 on different horizontal planes with respect to each other provides for ready engagement of the jaw member 19 with the coil of the spring and the pivotal mounting of the jaw member on the ends 18 of the lever maintains the jaw in proper engagement with the spring during the pivotal movement of the lever.

To replace the spring, the tool after the spring is compressed therebetween, is placed in inverted position as shown in Figure 9, wherein the jaw member 19 occupies upper position. This reverse position of the tool permits the location of the upper end of the spring in the upper end of the recess and at the same times provides suitable clearance between the tool and the upper flange of the opening E. When the spring is in position, the tool can be either retracted with both of the jaws disengaging the spring at the same time or the tool can be tilted so as to disengage the jaw 19 from the spring before the jaw 25 is disengaged. Thus it will be seen that the tool can be used for various purposes and that the use of the tool greatly facilitates the assembly and disassembly of the valve mechanism.

The device is of simple but rugged construction and contains very few parts which are not liable to get out of order.

While I have shown and described the preferred form of my improved tool, it is obvious that various modifications can be made in my invention without departing from the spirit thereof.

I claim:

1. A tool of the class described comprising in combination a pair of longitudinally disposed levers, each having one of their ends bifurcated to form spring engaging jaws, said jaws being adapted to be arranged in the same vertical plane, a slot and pin connection pivotally connecting the opposite ends of said levers whereby one of said levers can be moved longitudinally so as to dispose the jaw thereof rearwardly of the jaw of the other lever, a laterally disposed projection formed on one of said levers, and an extension formed on the other member and projecting vertically therefrom for engaging said transverse projection and locking said levers against longitudinal movement relatively to each other.

2. In a tool of the class described, the combination of a pair of levers, one of which is channel-shaped in cross section with the flanges presented downwardly and the other consists of two spaced bars arranged adjacent to the sides of the first lever, a plurality of spacers secured to said spaced bars near the forward end thereof, a pin fixed to said spaced bars adjacent to the rear end thereof, said channel-shaped lever being provided in its flanges with longitudinally disposed slots for receiving the last-mentioned pin whereby a slot and pin pivot is provided for said levers and said levers can be moved longitudinally relatively to each other, the front end of each lever being provided with a jaw, said jaws being disposed in opposite relation and adapted to be arranged in vertical plane with each other to receive therebetween and compress a coiled spring of a valve assembly, a sliding member embracing said levers and movable longitudinally thereof to lock said levers in spring compressing position, and a member pivotally mounted on one of said spacers near the forward end of said spaced bars and movable into extended position to form a fulcrum for the latter when used as a valve lifter, the channel-shaped lever being movable longitudinally to position the jaw end thereof rearwardly of the jaw end of the other lever when the latter is used as a valve lifter.

3. In a tool of the class described, the combination of a pair of levers having a slot and pin connection with each other near one of their ends, whereby said levers are pivotally connected and movable longitudinally relatively to each other, the free end of each lever being provided with a jaw, said jaws being disposed in opposed relation to receive therebetween and compress a coiled spring of a valve assembly, a lateral projection on one of said levers near the jaw end thereof, an extension extending vertically from the other lever and adapted to engage said projection so as to hold said levers against longitudinal movement relatively to each other, and a locking member slidably mounted on said levers for locking the latter in spring compressing position.

4. A combined valve lifter and spring compressor comprising a pair of levers pivotally connected near their ends, said levers having oppositely disposed seat defining jaws at their free ends, the jaw of one of said levers being movable longitudinally to bring its seat out of opposition with the other jaw, and means for holding said levers together in either position.

5. A combined valve lifter and spring compressor comprising a pair of levers pivotally connected near their ends, said levers having oppositely disposed seat defining jaws at their free ends, one of said jaws being mounted for oscillation and having flanges to engage the coils of a spring, and means for limiting the oscillation of said jaws between fixed limits.

6. A combined valve lifter and spring compressor comprising a pair of levers pivotally connected near their ends, said levers having oppositely disposed seat defining jaws at their free ends, one of said jaws having flanges to engage the coils of a spring, said flanges being out of alinement horizontally, and means mounted on and slidable along said levers for holding said levers together while compressing a spring.

In testimony whereof I hereunto affix my signature this 21st day of November, 1930.

JOSEPH SUNNEN.